US008482247B2

(12) United States Patent
Lechte et al.

(10) Patent No.: US 8,482,247 B2
(45) Date of Patent: Jul. 9, 2013

(54) PACKAGE FOIL FOR PROTECTING WIND TURBINE COMPONENTS FROM THE ENVIRONMENT, METHOD FOR PACKAGING A WIND TURBINE COMPONENT, AND WIND TURBINE COMPONENT ASSEMBLY

(75) Inventors: Markus Lechte, Emsdetten (DE); Joerg Wanink, Nordhorn (DE)

(73) Assignee: General Electric Company, Schenectady, NY (US)

( * ) Notice: Subject to any disclaimer, the term of this patent is extended or adjusted under 35 U.S.C. 154(b) by 609 days.

(21) Appl. No.: 12/766,456

(22) Filed: Apr. 23, 2010

(65) Prior Publication Data

US 2011/0133683 A1 Jun. 9, 2011

(51) Int. Cl.
*H01M 10/44* (2006.01)
*H01M 10/46* (2006.01)

(52) U.S. Cl.
USPC ........................................................ 320/101

(58) Field of Classification Search
USPC .......... 320/101, 107, 114, 115, 138; 136/243, 136/244; 290/1 R, 42, 43, 50, 53, 54
See application file for complete search history.

(56) References Cited

U.S. PATENT DOCUMENTS

| 2006/0108612 | A1  | 5/2006 | Richmond |
| 2008/0196758 | A1* | 8/2008 | McGuire ........................ 136/245 |
| 2008/0202825 | A1* | 8/2008 | Kerish ............................ 180/2.2 |
| 2010/0181958 | A1* | 7/2010 | Caudill ........................... 320/101 |
| 2010/0221111 | A1* | 9/2010 | Nieuwenhuizen .............. 416/61 |
| 2011/0020123 | A1* | 1/2011 | Anderson et al. ............... 416/98 |

FOREIGN PATENT DOCUMENTS

| CN | 201122641 Y      | 9/2008 |
| KR | 1020000073212 A | 5/2005 |

\* cited by examiner

*Primary Examiner* — Edward Tso
(74) *Attorney, Agent, or Firm* — Global Patent Operation; Douglas D. Zhang

(57) ABSTRACT

The present disclosure relates to a package foil for a wind turbine component, the wind turbine component including a battery, wherein the package foil includes at least one photovoltaic cell. Further, the present disclosure relates to a wind turbine component assembly, including a wind turbine component including a battery, package foil covering the wind turbine component, at least one photovoltaic cell, the at least one photovoltaic cell being connectable or being electrically connected to the battery of the wind turbine component for recharging the battery. Additionally, the present disclosure relates to a method for packaging a wind turbine component, the wind turbine component including a battery, including Establishing an electrical connection between the at least one photovoltaic cell and the battery; and packaging the wind turbine component with a package foil, the package foil including at least one photovoltaic cell.

20 Claims, 5 Drawing Sheets

PACKAGE FOIL FOR PROTECTING WIND TURBINE COMPONENTS FROM THE ENVIRONMENT, METHOD FOR PACKAGING A WIND TURBINE COMPONENT, AND WIND TURBINE COMPONENT ASSEMBLY

BACKGROUND

The present disclosure relates to a package foil for a wind turbine component. Further, the present disclosure relates to a wind turbine component assembly. In particular to a wind turbine component assembly, including a wind turbine component including a battery. Additionally, the present disclosure relates to a method for packaging a wind turbine component.

Typically, wind turbines are assembled on the wind turbine site from several assembling parts, for example tower portions, the hub, the rotor blades, the generator, a control cabinet, which are separately transported to the wind turbine site. Thus, these parts are stored before transportation at different locations, sometimes in open air. Several of these assembling parts include rechargeable batteries, for example for an emergency pitch drive, or a control cabinet. When stored in open air, over some period of times, the batteries discharge and may deteriorate or get out of order.

BRIEF DESCRIPTION

In view of the above, in an embodiment, a package foil for a wind turbine component is provided, the wind turbine component including a battery, wherein the package foil includes at least one photovoltaic cell.

According to a further embodiment, a wind turbine component assembly is provided, including a wind turbine component including a battery, package foil covering the wind turbine component, at least one photovoltaic cell, the at least one photovoltaic cell being connectable or being electrically connected to the battery of the wind turbine component for recharging the battery.

Additionally, a further aspect concerns a method for packaging a wind turbine component, the wind turbine component including a battery, including Establishing an electrical connection between the at least one photovoltaic cell and the battery; and packaging the wind turbine component with a package foil, the package foil including at least one photovoltaic cell.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Figure 1:
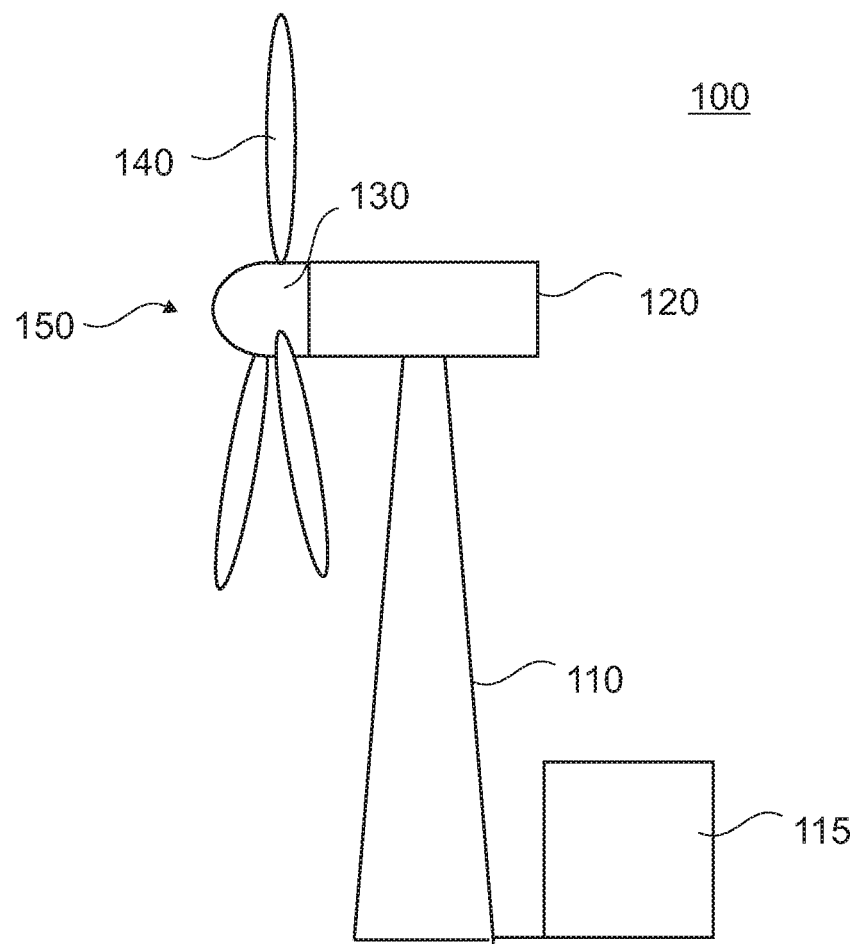
FIG. 1 shows schematically an embodiment of a wind turbine.

FIG. 1 shows a wind turbine 100. The wind turbine 100 includes a tower 110 on which a nacelle 120 is mounted. The nacelle 120 is rotatable about a vertical axis of the tower. Within the nacelle 120, a generator (not shown) for transforming rotational energy into electrical energy is placed. The generator is connected to a hub 130 that is rotatable about a horizontal axis. Three rotor blades 140 are connected to the hub 130. The rotor blades 140 and the hub 130 together form a wind rotor of the wind turbine 100. The wind turbine 100 operates as follows. In a typical situation, the nacelle 120 is rotated about the vertical axis such that the horizontal axis of the hub 130 is approximately parallel to a wind direction. The wind exerts a torque on the wind rotor due to an aerodynamical profile of the rotor blades 140. Accordingly, the wind rotor rotates about its horizontal axis, thus driving the generator. The generator transforms the mechanical rotation into an electric current. Hence, the kinetic energy of the wind is transformed into electric energy. In some embodiments, which may be combined with other embodiments disclosed herein, the wind turbine 100 may include an external container or control cabinet 115 for a control device or an inverter of the wind turbine 100. Typically, the controller of the wind turbine may be located in the external control cabinet 115, in a control cabinet inside the tower 110 or in the nacelle 120.

Wind turbine components need to be stocked in the period between a production and installation at the wind turbine site or commissioning. For preservation against environmental impact these components are typically packaged typically with a plastic package foil. In one embodiment, wind turbine components are temporarily packaged with the package foil. Typically, this package foil may surround or enclose the complete component. Typically, access to the interior of the wind turbine component is limited. Further, in typical situations, power supply for recharging the battery included in the wind turbine component is not available at external storage areas. Components including batteries may need recharging of integrated batteries, to avoid damages due to discharge. According to an embodiment, a solar operated recharging system integrated into the package foil enables a steady charging the batteries. A typical embodiment of a package system according to this disclosure combines the functions of protection and recharging of batteries in one system. Thus, maintenance work for stocked components is avoided. Further, according to some embodiments, damage to the batteries is reduced. Typical wind turbine components are typically bulky components, for example internal or external control cabinets, the hub, tower segments, rotor blades, the nacelle, or the generator, which are separately transported to the wind turbine site and assembled at the wind turbine site. Thus, they are typically temporarily enclosed by the package foil.

Figure 2:
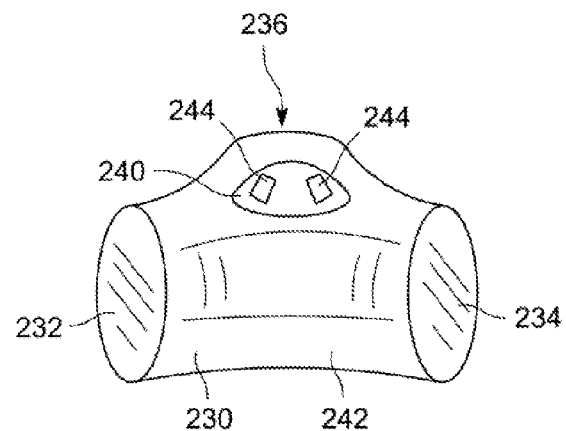
FIG. 2 shows schematically an embodiment of a hub packaged in a package foil.

FIG. 2 shows in a perspective view schematically a hub 230 having typically three openings 232, 234, 236 at which the rotor blades have to be fixed. Further, the hub has a shaft opening (not shown) where the hub is to be connected to the wind rotor shaft of the wind turbine. In a typical embodiment, during a storage period, the shaft opening may be covered by a lid 240. In another embodiment, which may be combined with other embodiments, the hub 230 may be stocked without a lid 240. In a typical embodiment, the hub may include a pitch system operated by batteries.

Typically, the hub 230 and the lid 240 are covered with a package foil 242. In particular the lid serves for preventing deformation of a puddle of rain water on the package foil 242, when the hub is stored outside. In other embodiments, the lid serves as a protection cover, in particular for a cavity of the wind turbine component. The lid 240 may include one or more solar cells, for example three solar cells 244. In a typical embodiment, the solar cells are provided together with the package foil 242, or are detachably connected to the package foil using a zipper, hook and loop fastener or easily removable glue, and the like. For example the glue may be removed by exposure to heat. In further embodiments, which may be combined with other embodiments disclosed herein the solar cells may be welded onto the package foil. In other embodiments, the solar cells or photovoltaic cells may be releasably connected to the lid 240 for example by screws, hook and loop fastener, sippers and/or removable glue, or they may be integrated in another embodiment into or welded onto the lid 240. Typically, the solar cells or photovoltaic cells 244 are disposed, such that they can capture enough light for charging a battery of the hub 230 hi a further embodiment, the lid may be integrated into or connected to the package foil 242. For example, the package foil 242 and the lid 240 may be welded together. In another embodiment, the hub 230 is substantially completely enclosed by the package foil 242. In an embodiment, which may be combined with other embodiments, the lid or the protection cover may be disposed below the package foil.

Figure 3:
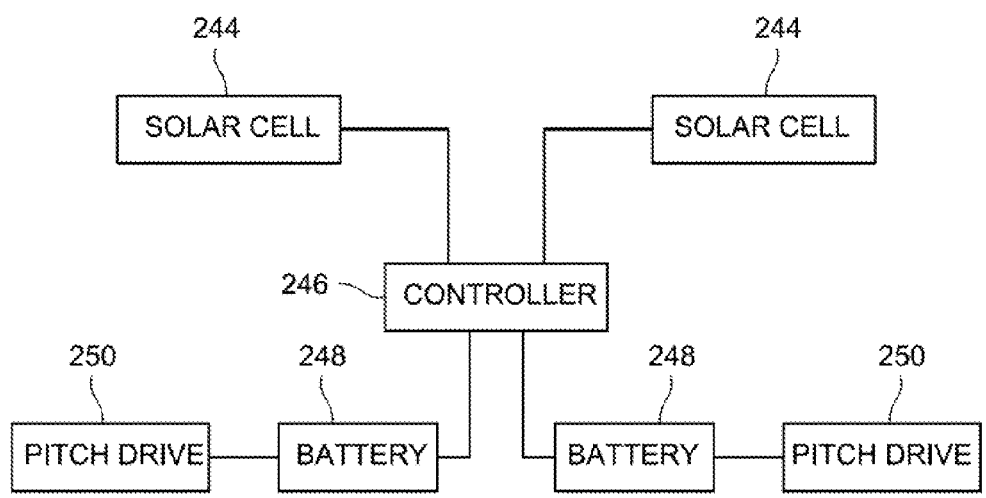
FIG. 3 shows schematically an embodiment of an electric circuit.

FIG. 3 schematically shows an embodiment of an electrical chart of the hub during a storage period. In an embodiment, the solar cells 244 are electrically connected to a controller 246. In an embodiment, the controller may be integrated into one of the solar cells. In another embodiment, which may be combined with other embodiments disclosed herein, the controller may be disposed in the lid 240. In a further embodiment, the controller may be a controller used for the pitch drive 250 in the hub. In a further embodiment, the controller may include a plurality of electronic components for controlling the charged current to the batteries 248. In another embodiment, the controller may include an integrated circuit or a programmable logic circuit. In a further embodiment, the hub 230 may include only one battery 248. In other embodiments, the hub may include for each hub drive a separate battery 248. In a typical embodiment, which may be combined with other embodiments disclosed herein, the batteries 248 may be electrically in connection with a pitch drive 250 disposed in the hub 230 which is ready for mounting on the wind turbine. Thus, even when the hub is stored between the period of production and commissioning, the batteries are charged or do not get discharged.

Figure 4:
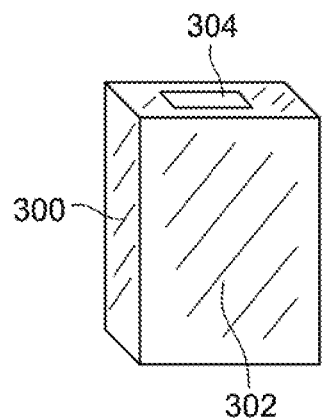
FIG. 4 shows schematically an embodiment of a control cabinet packaged in a package foil.

Typically, the package system for packaging the wind turbine components combines the function of protecting and recharging of batteries in the system. FIG. 4 shows a control cabinet 300 of a wind turbine generator which may be disposed during erection of the wind turbine component in the tower or into the nacelle of the wind turbine. A package foil 302 is substantially completely packaged or wrapped around the control cabinet 300 and includes a photovoltaic or solar cell 304 which is electrically connected to a battery within the control cabinet 300 for recharging the battery. In an embodiment, which may be combined with other embodiments disclosed herein, the package foil is a shrink foil. In embodiments, which may be combined with other embodiments disclosed herein, the package foil may include a volatile corrosion inhibitor exhaling from the package foil, such that an atmosphere is generated within the space enclosed by the package foil that inhibits a corrosion of the metallic components. Hence, it may be important, that the space is completely closed by the package foil. In other embodiments, a reusable package foil may be used, for example a thick plastic foil. The package foil may be any type of material suitable for protecting the enclosed component of the wind turbine, such as a plastic foil, for example apolyethylene foil or such as a vapor corrosion inhibitor (VCI) foil.

Figure 5:
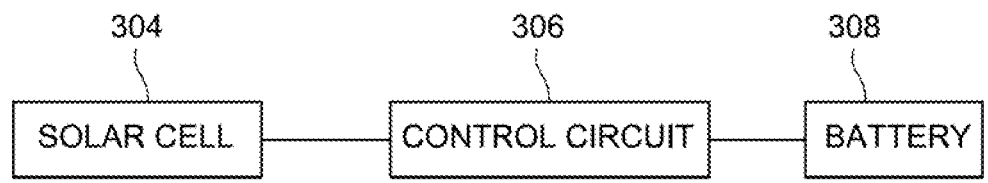
FIG. 5 shows schematically another embodiment of an electric circuit.

FIG. 5 shows schematically an embodiment of an electrical circuit of the control cabinet 300 in shown FIG. 4. The charging of a battery 308 is controlled by a control circuit 306 in electrical connection to the solar or photovoltaic cells 304. The battery 308 is disposed within the control cabinet 300.

Figure 6:
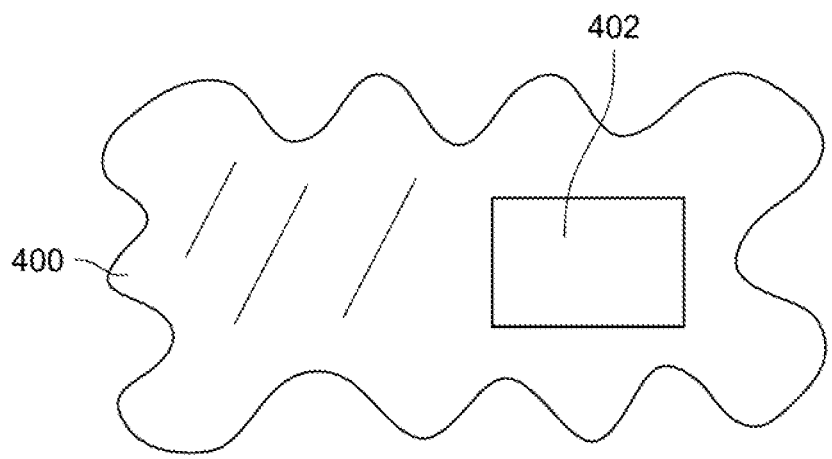
FIG. 6 shows schematically a portion of an embodiment of a package foil.

FIG. 6 shows schematically an embodiment of a package foil 400 including an integrated photovoltaic cell 402.

Figure 7:
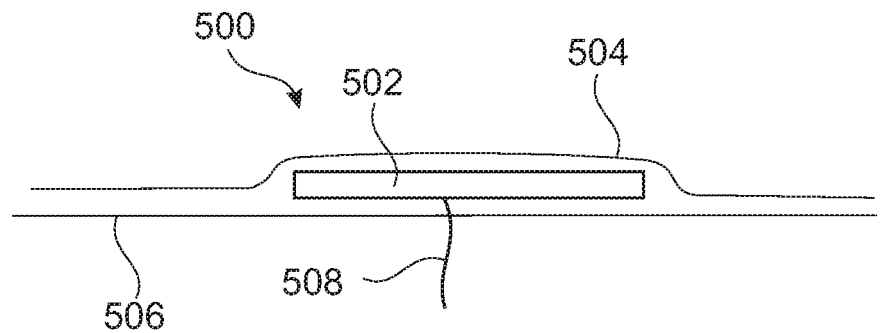
FIG. 7 shows schematically a side view of an embodiment of a package foil.

FIG. 7 shows a cross-section of an embodiment of a package foil 500. In an embodiment, the package foil is a double layered package foil including a cover layer 504 and a bottom layer 506. In a typical embodiment, the cover layer is to be directed to the exterior of the wind turbine component to be packaged. Typically, a photovoltaic cell 502 is disposed between the cover layer 504 and the bottom layer 506. Thus, the photovoltaic cell 502 is covered from both sides by a foil layer. A connection cable 508 of the photovoltaic cell 502 is connected electrically to the battery to be charged or to a control device for charging the battery. In another embodiment, a control circuit may be already disposed within the photovoltaic cell 502.

Figure 8:
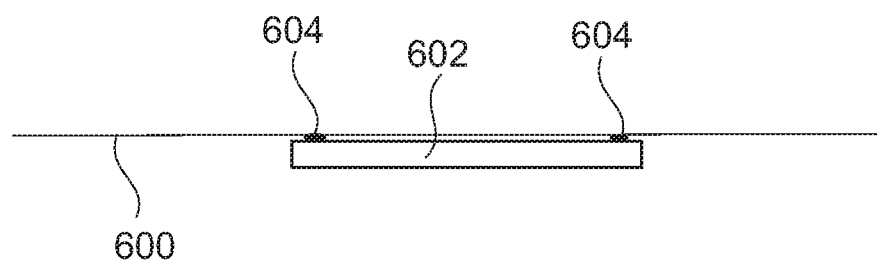
FIG. 8 shows schematically a side view of a further embodiment of a package foil.

FIG. 8 schematically shows a side view of an embodiment of a package foil 600 having a photovoltaic cell 602 attached thereto by glue points 604. Typically, in the embodiment of FIG. 8, the photovoltaic cell is placed within the space to be enclosed by the package foil. In a further embodiment, the package foil 600 is welded on the photovoltaic cell 602.

Figure 9:
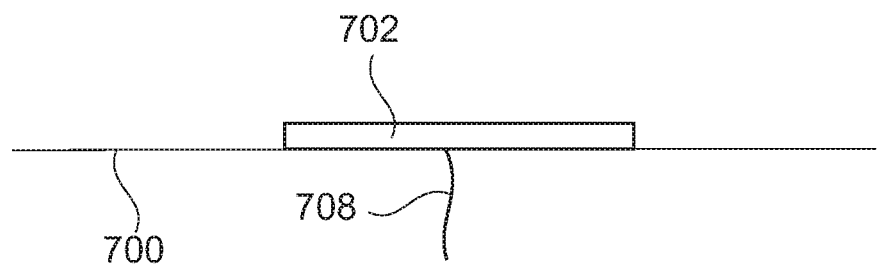
FIG. 9 shows schematically a side view of another embodiment of a package.

FIG. 9 shows another embodiment of a package foil 700 including a photovoltaic cell 702. The photovoltaic cell 702 is disposed in the side of the package foil 700 to be exposed to the environment. Thus, the sun light does not have to traverse or pass through the package foil 700 to reach the light sensitive side of the photovoltaic cell 700. A connection cable 708 of the photovoltaic cell 702 is connected electrically to the battery to be charged or to a control device for charging the battery. In another embodiment, a control circuit may be already disposed within the photovoltaic cell 702. Typically, the photovoltaic cell is welded onto the package foil 700, such that no air can pass through the hole in the package foil 700 for the connection cable 708.

In a typical embodiment, the photovoltaic cell is a crystalline photovoltaic cell, for example a thin film photovoltaic cell.

In other embodiments, which may be combined with embodiments disclosed herein, the photovoltaic cell may be a polymer or an organic solar cell which may be printed on the package foil.

Figure 10:
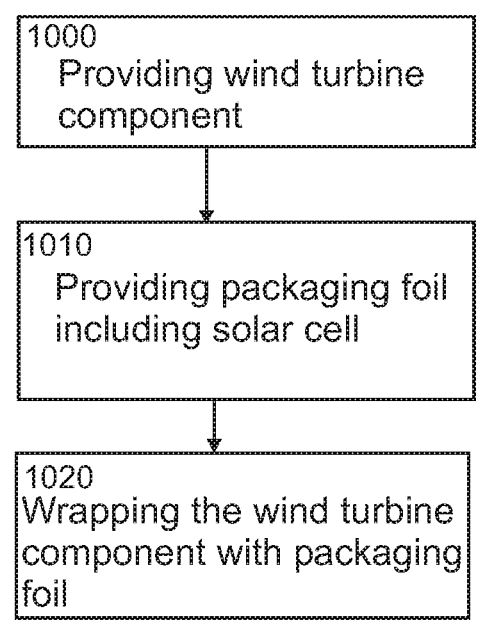
FIG. 10 shows schematically a flow chart of an embodiment of a method for packaging a component of a wind turbine.

In FIG. 10 a flowchart of a method for packaging a wind turbine component is shown. In box 1000, the wind turbine component is provided. For example, in an embodiment, the wind turbine component may be a component including a battery. Typically a wind turbine component is provided to be assembled to a wind turbine at the site of the wind turbine. For example, the wind turbine component may be a hub, a wind rotor blade and/or a control cabinet. In box 1010, a package foil is provided including a solar cell. For example, the solar cell or photovoltaic cell may be integrated into the package foil. Subsequently, in box 1020, the package foil is packaged or wrapped around the wind turbine component and an electrical connection is established between the photovoltaic cell or solar cell and a battery of the wind turbine component. Optionally, in a further step, the packaging is completely closed around the wind turbine component, such that a separate atmosphere may be created within the space enclosed by the package foil, for example in case that the package foil includes a volatile corrosion inhibitor which is evaporated from the package foil. For example, if the packaging is completely closed, a fluidal connection between the interior of the packaged wind turbine component and the exterior, for example the environmental atmosphere, is substantially avoided.

In a typical embodiment, which may be combined with other embodiments disclosed herein, the at least one photovoltaic cell may be releasably or unreleasably connected to the package foil. En a typical embodiment, the at least one photovoltaic cell is connected by at least one connection selected of the group consisting of a zipper, hook and loop fastener, welding, glue and a removable glue. Typically, in an embodiment, which may be combined with other embodiments disclosed herein, the wind turbine component is temporarily packaged with the package foil.

In a typical embodiment, the package foil further includes a protection cover, for protecting at least one portion of the wind turbine component, wherein the protection cover has a higher rigidity than the package foil. Typically, the protection cover is adapted to reduce the risk of ponding or puddling on the package foil when the package foil is wrapped or packaged around the wind turbine component. In an embodiment, the protection cover includes the at least one photovoltaic cell.

In an embodiment, which may be combined with other embodiments disclosed herein, the package foil is a shrinking film.

In an embodiment, which may be combined with other embodiments disclosed herein, the package foil includes the at least one photovoltaic cell. In a typical embodiment, the package foil encloses substantially completely the wind turbine component, such that a fluid connection between a space enclosed by the package foil and an environment exterior to the package foil is substantially avoided.

In a typical embodiment, which may be combined with other embodiments disclosed herein, the wind turbine component is adapted to be transported to and assembled to the wind turbine at the wind turbine site.

Typically, the wind turbine component is selected from the group consisting of a hub, the hub being adapted to be connected to the wind turbine blades, and a control cabinet.

In a typical embodiment, which may be combined with other embodiments disclosed herein, the wind turbine component assembly includes a protection cover, for protecting at least a portion of the wind turbine component, the protection cover having a higher rigidity than the package foil.

In a typical embodiment, which may be combined with other embodiments disclosed herein, the method includes connecting the at least one photovoltaic cell with the package foil. In a typical embodiment, the method includes providing a protection cover, the protection cover having a higher rigidity than the package foil, and placing the protection cover such that the risk of ponding on the package foil when packaged around the wind turbine component is reduced. Typically, the wind turbine component is packaged with a package foil, such that the package foil encloses substantially completely the wind turbine component, such that a fluid connection between an area enclosed by the package foil and an environment exterior to the package foil is substantially avoided.

In a typical embodiment, which may be combined with other embodiments disclosed herein, the method includes heating the package foil until the package foil conforms substantially to the form of the wind turbine component.

This written description uses examples to disclose the invention, including the best mode, and also to enable any person skilled in the art to practice the described subject-matter, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope is defined by the claims, and may include such modifications and other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A package foil for protecting a wind turbine component from the environment, the wind turbine component comprising a battery, wherein the package foil comprises at least one photovoltaic cell, the at least one photovoltaic cell being connectable to the battery.

2. The package foil according to claim 1, wherein
the at least one photovoltaic cell is releasably connected to the package foil.

3. The package foil according to claim 2, wherein
the at least one photovoltaic cell is connected by at least one connection selected of the group consisting of a zipper, a hook and loop fastener, and a removable glue.

4. The package foil according to claim 1, wherein
the at least one photovoltaic cell is unreleasably connected to the package foil.

5. The package foil according to claim 4, wherein
the at least one photovoltaic cell is connected by at least one connection selected of the group consisting of welding, and glue.

6. The package foil according to claim 1, further including a protection cover, for protecting at least one portion of the wind turbine component, wherein the protection cover has a higher rigidity than the package foil.

7. The package foil according to claim 6, wherein
the protection cover is adapted to reduce the risk of ponding or puddling on the package foil when the package foil is packaged around the wind turbine component.

8. The package foil according to claim 6, wherein
the protection cover includes the at least one photovoltaic cell.

9. The package foil according to claim 1, further comprising a protection cover that includes the at least one photovoltaic cell.

10. A wind turbine component assembly, comprising
a wind turbine component comprising a battery,
a package foil covering the wind turbine component, and
at least one photovoltaic cell, the at least one photovoltaic cell being connectable or being electrically connected to the battery of the wind turbine component for recharging the battery.

11. The wind turbine component assembly according to claim 10, wherein
the package foil comprises the at least one photovoltaic cell.

12. The wind turbine component assembly according to claim 10, wherein
the package foil encloses substantially completely the wind turbine component, such that a fluid connection between a space enclosed by the package foil and an environment exterior to the package foil is substantially avoided.

13. The wind turbine component assembly according to claim 10, wherein
the wind turbine component is adapted to be transported to and assembled to a wind turbine at a wind turbine site.

14. The wind turbine component assembly according to claim 10, wherein
the wind turbine component is selected from the group consisting of a hub, the hub being adapted to be connected to wind turbine blades, and a control cabinet.

15. The wind turbine component assembly according, to claim 10, further including a protection cover, for protecting at least a portion of the wind turbine component, the protection cover having a higher rigidity than the package foil.

16. A method for packaging a wind turbine component, the wind turbine component including a battery, comprising
establishing an electrical connection between at least one photovoltaic cell and the battery; and
packaging the wind turbine component with a package foil, the package foil including the at least one photovoltaic cell.

17. The method according to claim 16, further comprising connecting the at least one photovoltaic cell with the package foil.

18. The method according to claim 16, further comprising
providing a protection cover, the protection cover having a higher rigidity than the package foil, and
placing the protection cover such that the risk of ponding on the package foil when packaged around the wind turbine component is reduced.

19. The method according to claim 16, wherein
the package foil encloses substantially completely the wind turbine component, such that a fluid connection between an area enclosed by the package foil and an environment exterior to the package foil is substantially avoided.

20. The method according to claim 16, further comprising
heating the package foil until the package foil conforms substantially to the form of the wind turbine component.

* * * * *